(12) United States Patent
Zhao et al.

(10) Patent No.: US 12,481,261 B2
(45) Date of Patent: Nov. 25, 2025

(54) INTEGRATED MANAGEMENT AND CONTROL SYSTEM FOR POWER PLANT

(71) Applicant: Xi'an Thermal Power Research Institute Co., Ltd, Shaanxi (CN)

(72) Inventors: Zhangming Zhao, Shaanxi (CN); Lin Gao, Shaanxi (CN); Lin Wang, Shaanxi (CN); Ling Zha, Shaanxi (CN); Jun Li, Shaanxi (CN); Yong Xiao, Shaanxi (CN); Haidong Gao, Shaanxi (CN); Yuting Hou, Shaanxi (CN); Junbo Zhou, Shaanxi (CN); Mingkun Wang, Shaanxi (CN); Yaokui Gao, Shaanxi (CN); Yangxiang Lei, Shaanxi (CN); Wenyu Wang, Shaanxi (CN); Yanjun Guo, Shaanxi (CN); Linjuan Gong, Shaanxi (CN); Jinghao Dong, Shaanxi (CN); Xianrong Zhang, Shaanxi (CN)

(73) Assignee: XI'AN THERMAL POWER RESEARCH INSTITUTE CO., LTD, Shaanxi (CN)

( * ) Notice: Subject to any disclaimer, the term of this patent is extended or adjusted under 35 U.S.C. 154(b) by 491 days.

(21) Appl. No.: 18/192,340

(22) Filed: Mar. 29, 2023

(65) Prior Publication Data
US 2023/0350369 A1   Nov. 2, 2023

(30) Foreign Application Priority Data

Apr. 28, 2022 (CN) .......................... 202210443305.4
Aug. 9, 2022 (CN) .......................... 202210949942.9

(51) Int. Cl.
G05B 19/042 (2006.01)

(52) U.S. Cl.
CPC .... *G05B 19/042* (2013.01); *G05B 2219/2639* (2013.01)

(58) Field of Classification Search
CPC .......... G05B 19/042; G05B 2219/2639; G05B 19/052; G05B 15/02; H04L 67/12
See application file for complete search history.

(56) References Cited

U.S. PATENT DOCUMENTS 11,487,273 B1 * 11/2022 Zhao ................ G05B 19/41885

FOREIGN PATENT DOCUMENTS

| CN | 112327813 A | 2/2021 |
|----|----|----|
| CN | 113515514 | 10/2021 |

(Continued)

OTHER PUBLICATIONS

CNIPA, First Office Action for CN Application No. 202210949942.9, Jul. 22, 2023.

(Continued)

*Primary Examiner* — Chad G Erdman
(74) *Attorney, Agent, or Firm* — Hodgson Russ LLP

(57) ABSTRACT

The present disclosure provides an integrated management and control system for a power plant including a power plant cloud edge vertical architecture system, which includes an inter-plant cloud platform, a plurality of intelligent control platforms, and a plurality of plant-side edge cloud platforms. Each intelligent control platform corresponds to one plant-side edge cloud platform and one power plant that are located in the corresponding power plant. The intelligent control platform is positively interconnected to the corresponding plant-side edge cloud platform via a forward isolation device, and the intelligent control platform is inversely interconnected to the corresponding plant-side edge cloud platform via a network switching device and a reverse isolation device. The plant-side edge cloud platform (Continued)

is bidirectionally interconnected to the inter-plant cloud platform over a private power network. The plant-side edge cloud platform is a reduced capacity private edge cloud system for a power plant.

20 Claims, 2 Drawing Sheets

(56) References Cited

FOREIGN PATENT DOCUMENTS

| | | | | |
|---|---|---|---|---|
| CN | 113515514 A | * | 10/2021 | ........... G06F 9/5072 |
| CN | 113794714 | | 12/2021 | |
| CN | 114741199 A | | 7/2022 | |
| WO | WO-2021257448 A1 | * | 12/2021 | ............. G06F 9/541 |

OTHER PUBLICATIONS

CNIPA, First Office Action for CN Application No. 202210443305.4, Jun. 27, 2025.

* cited by examiner

INTEGRATED MANAGEMENT AND CONTROL SYSTEM FOR POWER PLANT

CROSS-REFERENCE TO RELATED APPLICATIONS

This application claims priority to Chinese Patent Application No. 202210443305.4, filed on Apr. 28, 2022, and Chinese Patent Application No. 202210949942.9, filed on Aug. 9, 2022, the entire disclosures of which are incorporated herein by reference.

FIELD

The present disclosure relates to a technical field of a power plant, and more particularly to an integrated management and control system for a power plant.

BACKGROUND

With the rapid development of Industrial Internet and cloud computing technology, these two technologies are rapidly applied in the industrial field, which provide a good platform for the various intelligent needs of the industrial manufacturing sector. At the same time, the construction of intelligent energy, especially intelligent power plants based on the above-mentioned technologies is flourishing, which demonstrates good prospects for technological development and market application for energy industry transformation and upgrading as well as the reduction of personnel and increase of efficiency in power generation enterprises. However, traditional information system architectures of the power generation enterprises based on distributed control systems (DCS) and supervisory information systems (SIS) cannot meet the needs of smart power plant construction, and the application of the common mainstream platforms for common business cloud computing in the power generation field has also exposed increasing problems. Thus, it is required to provide an integrated management and control system for a power plant.

SUMMARY

In view of this, the present disclosure provides an integrated management and control system for a power plant.

According to a first aspect of embodiments of the present disclosure, an integrated management and control system for a power plant is provided. The integrated management and control system for a power plant includes a power plant cloud edge vertical architecture system. The power plant cloud edge vertical architecture system includes an inter-plant cloud platform provided in a power generation area or a power generation group; a plurality of intelligent control platforms; and a plurality of plant-side edge cloud platforms. Each intelligent control platform corresponds to one plant-side edge cloud platform and one power plant, the intelligent control platform and the corresponding plant-side edge cloud platform are located in the corresponding power plant. The intelligent control platform is positively interconnected to the corresponding plant-side edge cloud platform via a forward isolation device, and the intelligent control platform is inversely interconnected to the corresponding plant-side edge cloud platform via a network switching device and a reverse isolation device. The plant-side edge cloud platform is bidirectionally interconnected to the inter-plant cloud platform over a private power network.

In some embodiments, in the integrated management and control system for the power plant, the plant-side edge cloud platform is a reduced capacity private edge cloud system for a power plant. The reduced capacity private edge cloud system for the power plant includes a cloud end located in a safety area III and configured to perform large-scale data analysis, calculation and storage; and an edge end located in a safety area I and configured to run various intelligent control algorithms and interact with the existing DCS of the power plant. The cloud end is connected to the edge end via a reverse isolation device and a forward isolation device, the cloud end is connected to a non-production information system located in the safety area III over a power plant management network, and the edge end is connected to the intelligent control platform over a DCS A/B network.

REFERENCE NUMERALS

Figure 1:
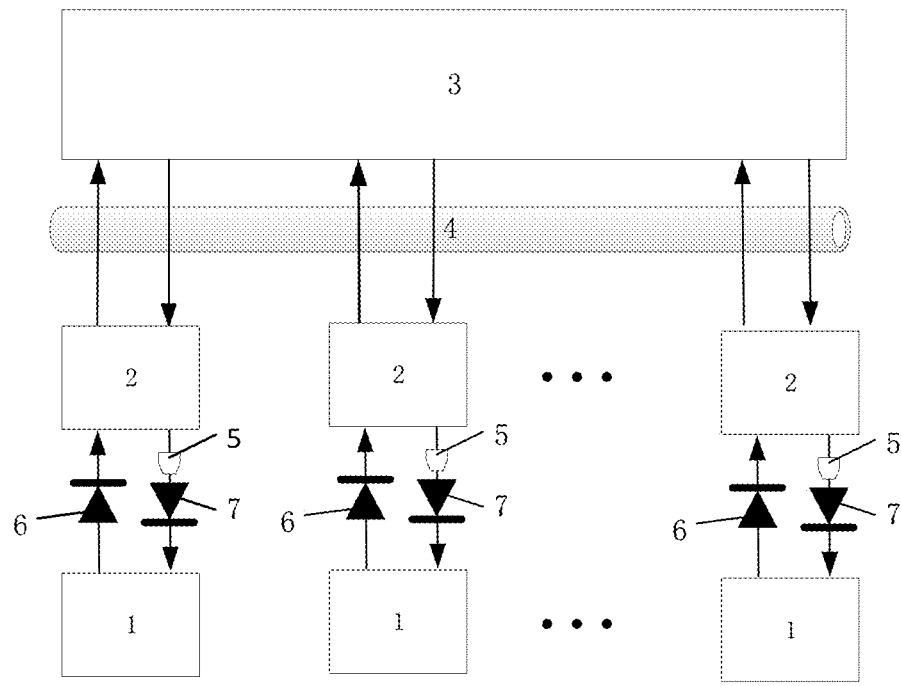
FIG. 1 is a schematic diagram showing a power plant cloud edge vertical architecture system according to an embodiment of the present disclosure.

1: intelligent control platform; 2: plant-side edge cloud platform; 3: inter-plant cloud platform; 4: private power network: 5: network switching device; 6: gigabit forward isolation device; 7: hundred megabits reverse isolation device; 8: server; 9: programmable logic controller; 10: communication card; 301: cloud end; 302: edge end; 303: reduced capacity IaaS layer; 304: reduced capacity PaaS layer; 305: reduced capacity SaaS layer; 306: edge node; 307: reverse isolation device; 308: forward isolation device.

DETAILED DESCRIPTION

At present, some emerging technologies, such as artificial intelligence, industrial Internet, intelligent control, cloud computing and big data are booming, which are deeply integrated with traditional manufacturing industries, enabling the manufacturing industry and helping the transformation and upgrading of the manufacturing industry. At the same time, the development of smart power plant technology based on the above-mentioned emerging technologies is flourishing and has become an important factor for transformation and upgrading of power generation enterprises, which has great potential for application. However, the construction of the smart power plants based on the above-mentioned technologies still faces many problems.

A distributed control system (DCS) software and a DCS hardware are severely coupled. DCS with a certain brand generally requires a specific hardware, which leads to high system maintenance costs and a long development cycle of new functions. In addition, due to technical barriers, the product iteration cycle is long and it is hard to form a complete technical chain. DCS plays a dominant role in a control system of a generator unit. Due to the serious coupling of the software and the hardware, DCS is hard to meet the construction requirements of smart power plants, and the traditional DCS architecture is hard to meet the needs of modern power plants. It is required to develop a new control system technical architecture suitable for constructing modern power generation enterprises.

Although the DCS architecture is not applicable to the construction of smart power plants, it is not feasible to completely replace its dominant position in the power generation industry at present. Therefore, it is required to provide a method to organically integrate the existing DCS with various smart applications, or to modify the applicability of the existing DCS to meet the requirements of the construction of smart power plants.

Various intelligent control technologies have been applied in thermal power units to a certain range in a form of plug-in controllers, which are essentially the expansion of DCS functions. The expansion enhances the DCS functions to some extent. However, with each addition of intelligent control technology, power generation enterprises need to add an additional set of external devices, which not only cannot achieve the cooperation with the DCS control loops, but also brings serious resource waste and various uncertainties.

The construction of smart power plants based on an independent inter-plant cloud platform or a plant-side edge cloud cannot meet the requirements. On the one hand, the smart power plants are typical data-driven applications, and data of a single power plant cannot meet requirements of intelligent applications. The intelligent applications developed based on an independent plant-side edge cloud do not have portability and cannot be directly applied to other power plants. On the other hand, although a mode based on the inter-plant cloud platform may meet the data requirements of some intelligent applications, and develop many portable intelligent applications, there are some defects. Firstly, the inter-plant cloud platform mode cannot meet the personalized needs of the power plants. Different power plants and different units of the same power plant often have huge differences, and the intelligent applications developed based on the inter-plant cloud platform cannot fully meet the personalized needs of the single power plant. Secondly, the intelligent applications developed based on the inter-plant cloud platform cannot achieve closed-loop control since the real-time requirements and reliability of the application based on the inter-plant cloud platform cannot meet the requirements of the power plant control. The reliability and the real-time requirements for the operation of the generator set are relatively high, and there is a delay between the inter-plant cloud platform and the power plant unit, such that the failures of the cloud end will directly affect the normal operation of the generator set. Finally, because the power generation industry is a basic industry that involves the national economy and the people's livelihood, the power generation enterprises have strict requirements for information and data security. It is hard to implement a process of directly interacting the power plant control system with the inter-plant cloud platform.

It is required to control safety. An information security control strategy from a safety area I to a safety area III of the power plant is relatively strict. Data is transmitted from the safety area I to the safety area III through a forward isolation device, and the forward isolation device only allows limited data transmission from the safety area I to the safety area III. Data is transmitted from the safety area III to the safety area I through a reverse isolation device, and the reverse isolation device only allows single-bit data transmission per second. Due to the single-bit data transmission, the intelligent model cannot be distributed to the control platform for control, which is unfavorable for the application of AI, big data and other technologies at the power plant control level.

To sum up, the existing smart power plant architecture cannot be fully implemented, and it is required to provide a power plant cloud edge vertical architecture system and a method for controlling the power plant cloud edge vertical architecture system.

The present disclosure provides a power plant cloud edge vertical architecture system, which may achieve effective collaboration between an inter-plant cloud and a plant-side edge cloud secondary cloud, and safe and reliable collaboration between a plant-side edge cloud and a power plant intelligent control platform.

In order to achieve the above-mentioned purpose, the power plant cloud edge vertical architecture system includes an inter-plant cloud platform provided in a power generation area or a power generation group, a plurality of intelligent control platforms, and a plurality of plant-side edge cloud platforms. Each intelligent control platform corresponds to one plant-side edge cloud platform and one power plant, the intelligent control platform and the corresponding plant-side edge cloud platform are located in the corresponding power plant. The intelligent control platform is positively interconnected to the corresponding plant-side edge cloud platform via a forward isolation device, and the intelligent control platform is inversely interconnected to the corresponding plant-side edge cloud platform via a network switching device and a reverse isolation device. The plant-side edge cloud platform is bidirectionally interconnected to the inter-plant cloud platform over a private power network.

During operation, the intelligent control platform is configured to preprocess and upload data to the plant-side edge cloud platform via a gigabit forward isolation device. The plant-side edge cloud platform is configured to upload the data preprocessed to the inter-plant cloud platform over the private power network. The inter-plant cloud platform distributes the intelligent control model and common application or derived data required by the power plant to the plant-side edge cloud platform through the private power network. The plant-side edge cloud platform sends the intelligent control model or derived data received to the intelligent control platform through the network switching device and a 100-megabyte reverse isolation device.

The intelligent control platform includes a high-performance server, a plurality of programmable logic controllers (PLCs) and a plurality of communication cards. Each PLC corresponds to one communication card. The high-performance server is connected to the PLCs via a control bus, and the PLC is connected to a distributed control system (DCS) via the corresponding communication card.

The high-performance server is configured to perform inference operations and data calculation of the intelligent control model. The PLC is configured to perform an intelligent control algorithm that is not compatible with an existing DCS of the power plant. The communication card is configured to unilaterally synchronize data from the PLC to the DCS. The high-performance server is provided with an OPC client, and the data collected by the DCS is transmitted to the server in a unilateral communication mode via the OPC client and an OPC server in the DCS.

The plant-side edge cloud platform is a reduced capacity private edge cloud, and is located at a safety area III in the power plant The inter-plant cloud platform adopts an industrial Internet architecture, and includes 100 to 400 server nodes.

The inter-plant cloud platform includes a cloud resource layer constructed by an open-source OpenStack technology; a data resource and service layer comprising big data management tools, big data processing engine management tools, data development tools and software engineering development, testing and deployment tools; and a foreground application layer constructed based on a microservice architecture.

Distributing, by the inter-plant cloud platform, the intelligent control model and common application or derived data required by the power plant to the plant-side edge cloud platform through the private power network includes isolating the server from the DCS; in response to opening of the network switching device, sending the intelligent control model or the derived data to the intelligent control platform via the 100-megabyte reverse isolation device, so as to allow the intelligent control platform to directly control production of the power plant.

There are two ways for the intelligent control platform to directly control production of the power plant. In a first way, the plant-side edge cloud platform sends the intelligent control model trained to the high-performance server in a form of hierarchical Docker. The high-performance server performs real-time inference of the intelligent control model, and sends a real-time inference result to the corresponding PLC via a control bus to directly control the production of the power plant. In a second way, a real-time reasoning result of the intelligent control model in the high-performance server is sent to the corresponding PLC, and then a controlling instruction of the PLC is sent to the DCS to control the production of the power plant through an original control loop of the DCS.

When distributing the intelligent control model to the high-performance server in the form of hierarchical Docker, a complete Docker Base image for each intelligent control model is distributed to share. When it is required to distribute any new intelligent control model or update any intelligent control model, the new intelligent control model or an updated part of the intelligent control model is distributed, and a new image is generated by extending the Docker Base image.

During the operation of the cloud edge vertical architecture system of the smart power plant in the present disclosure, the intelligent control platform and the corresponding plant-side edge cloud platform are positively interconnected via the gigabit forward isolation device, the intelligent control platform and the corresponding plant-side edge cloud platform are inversely interconnected via the network switching device and the hundred megabits reverse isolation device, and the plant-side edge cloud platform and the inter-plant cloud platform are bidirectionally interconnected through the private power network. In this way, the existing DCS architecture may meet the needs of the smart power plant construction, and serious coupling of the existing DCS software and hardware may be avoided through the intelligent control platform, which is conducive to reducing a development cycle of the new control technology, and reduce the technical difficulty and the cost of constructing the smart power plants by using the existing DCS on the premise of ensuring safety and reliability. In addition, through an integrated platform, the present disclosure effectively reduces the security risks and the resource waste caused by plug-in controllers, enhances the replicability of the intelligent controlling process, and greatly reduces the promotion cost of the intelligent controlling process. At the same time, by establishing the secondary cloud of the plant-side edge cloud platform and the inter-plant cloud platform, delay, instability and security problems brought by a primary cloud architecture are effectively avoided, and the personalized and common needs of different power plants may be considered. Further, the smart power plant based on the secondary cloud architecture may make full use of the data resources of the whole group, which may provide the required data for data-driven applications such as artificial intelligence (AI) and big data.

In order to enable those skilled in the art to better understand the present disclosure, the following will give a clear and complete description of the technical solution in embodiments of the present disclosure in combination with the drawings in embodiments of the present disclosure application. Obviously, the described embodiments are only part of embodiments of the present disclosure application, not all of them, and are not intended to limit the scope of the present disclosure. In addition, the description of common structures and technologies is omitted in the following description to avoid unnecessary confusion about the concepts disclosed in the present disclosure. Based on embodiments in the present disclosure, all other embodiments obtained by those skilled in the art without creative work fall within the protection scope in the present disclosure.

A structural schematic diagram according to an embodiment of the present disclosure is shown in the drawings. These drawings are not drawn to scale. For the purpose of clear expression, some details are enlarged, and some details may be omitted. The shapes of various areas and layers and the relative size and position relationship between them shown in the drawings are only illustrative. In practice, there may be deviations due to manufacturing tolerances or technical limitations. In addition, those skilled in the art can design areas/layers with different shapes, sizes and relative positions according to actual needs.

Figure 2:
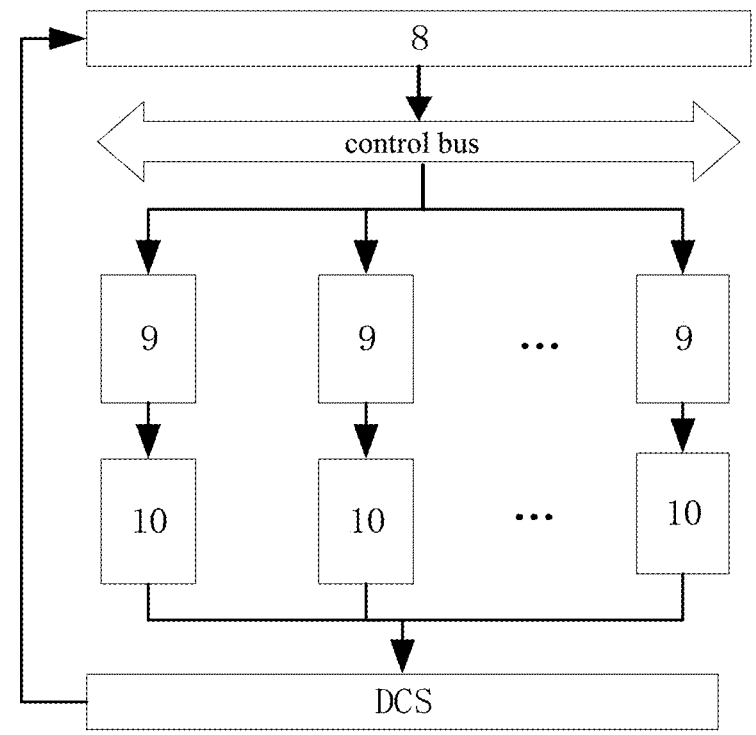
FIG. 2 is a schematic diagram showing an intelligent control platform in a power plant cloud edge vertical architecture system in FIG. 1.

Referring to FIG. 1 and FIG. 2, the power plant cloud edge vertical architecture system in the present disclosure includes an inter-plant cloud platform 3, a plurality of intelligent control platforms 1 and a plurality of plant-side edge cloud platforms 2. One intelligent control platform 1 and one plant-side edge cloud platform 2 are constructed in each power plant, and the inter-plant cloud platform 3 is constructed in a power generation industry or a power generation group. Each intelligent control platform 1 corresponds to one plant-side edge cloud platform 2. The intelligent control platform 1 is positively interconnected to the corresponding plant-side edge cloud platform 2 via a gigabit forward isolation device 6, and the intelligent control platform 1 is inversely interconnected to the corresponding plant-side edge cloud platform 2 via a network switching device 5 and a hundred megabits reverse isolation device 7. The plant-side edge cloud platform 2 is bidirectionally interconnected to the inter-plant cloud platform 3 over a private power network 4.

During operation, the intelligent control platform 1 preprocesses and uploads data to the plant-side edge cloud platform 2 via the gigabit forward isolation device 6. The plant-side edge cloud platform 2 uploads the data preprocessed to the inter-plant cloud platform 3 over the private power network 4. The inter-plant cloud platform 3 sends an intelligent control model and a common application or derived data required by the power plant to the plant-side edge cloud platform 2 over the private power network 4, and the plant-side edge cloud platform 2 distributes the intelligent control model or derived data received to the intelligent control platform 1 via the network switching device 5 and the hundred megabits reverse isolation device 7.

The intelligent control platform 1 includes a high-performance server 8, a plurality of PLCs 9 and a plurality of communication cards 10. Each PLC 9 corresponds to one communication card 10. The high-performance server 8 is configured to perform inference operations and data calculation of the intelligent control model. The PLC 9 is configured to perform an intelligent control algorithm that is not compatible with an existing DCS of the power plant to control the system. The communication card 10 is configured to unilaterally synchronize data from the PLC 9 to the DCS. The high-performance server 8 is provided with an OPC client, and the data collected by the DCS is transmitted to the high-performance server 8 in a unilateral communication mode via the OPC client and an OPC server in the DCS.

The plant-side edge cloud platform 2 is a reduced capacity private edge cloud, and is located at a safety area III in the power plant, which provides the ability to participate in model training of local control and individual requirements of individual power plants. The IaaS layer of the plant-side edge cloud platform 2 adopts a hyper-integrated integrated machine technology to perform computing virtualization, storage virtualization and network virtualization, so as to construct a virtual resource pool, realize centralized management, real-time allocation and automatic recovery of resources, and provide elastic and scalable virtual machine resources upward. The PaaS layer of the plant-side edge cloud platform 2 provides a container component, a data collecting component, a data storage component, a data asset management component, a data service component, a low-code AI modeling component and a visual report component. The container component is deployed on a virtual machine provided by the IaaS layer. Other components of the PaaS layer and the SaaS application service are deployed by using the containers or the IaaS layer virtual machines, and unified management of the containers and the virtual machines is realized through a K3S technology. The plant-side edge cloud platform 2 forms a plant-side unified data platform through the data collecting component, the data storage component, the data asset management component and the data service component to achieve unified collection, storage, management and external services of the plant-side data, achieve unified intelligent analysis of the data through the low-code AI modeling component, and form a unified portal for the smart power plant through the visual report component. The application of the SaaS layer of the plant-side edge cloud platform 2 adopts the micro-service architecture and container deployment to facilitate the application collaboration with the inter-plant cloud platform 3.

The inter-plant cloud platform 3 is connected to the plurality of plant-side edge cloud platforms 2 by using the industrial Internet architecture to meet the common needs of all power plants. The inter-plant cloud platform 3 is deployed in the headquarters of the power generation group or other areas that are easy to maintain, and includes 100 to 400 server nodes to face all authorized users of the power plant, which supports high concurrency and large-scale data analysis, and has data storage and analysis capabilities reach more than 1000 PB.

The inter-plant cloud platform 3 is divided into a cloud resource layer, a data resource and service layer and a foreground application layer, which are constructed by using open source cloud computing technology to achieve centralized management and optimal scheduling of data resources and storage computing resources, and may serve business development of multi-tenancy. The cloud resource layer of the inter-plant cloud platform 3 is constructed by an open-source OpenStack technology, which realizes unified management of server, network and storage resources, and provides virtual machine, bare platform, network, and storage services to authorized users. The data resource and service layer includes big data management tools, big data processing engine management tools, data development tools and software engineering development, testing and deployment tools. The big data management tools are constructed based on common big data storage technology, real-time database technology and data warehouse technology, the data development tools are constructed based on the open-source OpenStack technology, and the visual software engineering development tools are constructed based on common software engineering technology, which fully support modbus, 104 protocol and IEC industrial control communication mode. The foreground application layer is constructed based on a micro-service architecture and deployed by using containers to rapidly deploy the common applications developed to the plant-side edge cloud platform 2.

The plant-side edge cloud platform 2 sends the intelligent control model trained or derived data to the intelligent control platform 1 of the power plant via the network switching device 5 and the hundred megabits reverse isolation device 7. The high-performance server is isolated from the DCS, and the network switching device 5 is turned on manually. The intelligent control model or the derived data are sent to the intelligent control platform 1 via the hundred megabits reverse isolation device, so as to allow the intelligent control platform 1 to directly control production of the power plant.

There are two ways for the intelligent control platform 1 to directly control production of the power plant. In a first way, the plant-side edge cloud platform 2 sends the intelligent control model trained to the high-performance server 8 in a form of hierarchical Docker. The high-performance server 8 performs real-time inference of the intelligent control model, and sends a real-time inference result to the corresponding PLC 9 via a control bus to directly control the production of the power plant. In a second way, each PLC 9 communicates with the DCS via the corresponding communication card 10. Specifically, a real-time reasoning result of the intelligent control model in the high-performance server 8 is sent to the corresponding PLC 9, and then a controlling instruction of the PLC 9 is sent to the DCS to control the production of the power plant through an original control loop of the DCS.

When the intelligent control model is sent to the high-performance server 8 in the form of hierarchical Docker, a complete Docker Base image is distributed for each intelligent control model to share. When it is required to distribute any new intelligent control model or update any intelligent control model, the new intelligent control model or an updated part of the intelligent control model is distributed, and a new image is generated by extending the Docker Base image.

In some embodiments, as shown in FIG. 1 and FIG. 2, a power plant cloud platform edge end vertical architecture system of a power group is constructed by a plurality of intelligent control platforms 1, a plurality of plant-side edge cloud platform 2 and an inter-plant cloud 3 that are coordinated. The "cloud" refers to the inter-plant cloud platform 3, the "edge" refers to the plant-side edge cloud platform 2, and the "end" refers to the intelligent control platform 1. The smart power plant cloud edge vertical architecture system needs to construct the intelligent control platform 1 and the plant-side edge cloud platform 2 in each power plant, and construct the inter-plant cloud platform 3 in the power generation industry or the power generation group. The intelligent control platform 1 directly interacts with the plant-side edge cloud platform 2, and the plant-side edge cloud platform 2 interacts directly with the inter-plant cloud platform 3.

In addition, in a related art, industrial Internet and cloud computing technology are rapidly developed, and have been rapidly applied in the industrial field, which provides a good platform basis for solving various intelligent needs in the industrial manufacturing field. At the same time, the construction and technological development of smart energy, especially smart power plants based on the above-mentioned technologies are flouring, showing a good technical development and market application prospect for the transformation of the energy industry and the reduction of power generation enterprises. However, the mainstream platform for common business cloud computing in the application of the power generation has some problems as follows.

(1) The real-time performance of the mainstream platform for common business cloud computing cannot meet the control requirements of the power plant.

The mainstream platform for common business cloud computing focuses on comprehensive software systems having scalability, concurrency and versatility. At present, the real-time performance of the mainstream platform for common business cloud computing may reach the second level, which may well meet the needs of most commercial applications. However, the business type of the power plant is relatively sample, and the time delay requirement is high. Especially for power plant control, real-time requirements of many control systems require to reach a level of millisecond, and the mainstream common commercial cloud computing platform with complex architecture is hard to meet the real-time requirement of millisecond.

(2) The reliability of the mainstream platform for common business cloud computing is poor.

At present, the mainstream common commercial cloud computing platform generally adopts a variety of open source components with complex architecture. The operating system and the hardware equipment adopted are relatively low-cost products, and the software is generally developed in python, scala and other computer languages, which leads to poor system reliability. For power plant control, the instability of the system generally causes undesired consequences.

(3) The mainstream common commercial cloud computing platform consumes a lot of hardware resources.

The mainstream common commercial cloud computing platform is from the Internet industry, and its architecture is centered on solving the high concurrent requests of massive users. Therefore, most of the components are designed based on large-scale distributed clusters, resulting in cumbersome and more hardware resources, which is significantly different from the business requirements of the power plants. The service object of the smart power plant is the limited number of staff in the power plant, and the data that is required to be processed is a small amount of operation and production data of the power plant, so the cumbersome mainstream common commercial cloud computing platform will increase the investment cost of the power plant. However, the high concurrent processing capacity is not what the power plant needs, resulting in wasting the talent on a petty job.

(4) The maintenance cost of the mainstream platform for common business cloud computing is high.

On the one hand, the mainstream common business cloud computing platform has a complex architecture, numerous components and complex maintenance technology, which generally requires a variety of professional IT technologies. On the other hand, for security reasons, the construction of the smart power plant cloud platform generally adopts the private cloud model, and the power plants have strict control over network access, so that it is hard to achieve remote maintenance, and the power plant staff do not have professional cloud platform maintenance capabilities, which causes high maintenance cost and long maintenance period of the mainstream common commercial cloud computing platform during operation of the power plant, resulting in increasing operation cost of the power plant.

(5) The mainstream platform for common business cloud computing cannot meet the safety requirements of the power plants.

The information security requirements of power plants are relatively high, which need to meet the basic requirements of the national information security law and the level protection, especially for the power production control system. The mainstream platform for common business cloud computing generally uses user authority authentication to ensure data security, but there is no solution for network information security, which has an information security risk for the power plant control system.

In summary, the cloud platform for the smart power plant meets the requirements as follows. (1) The cloud platform has high reliability, and the smart power plant cloud platform has the ability to operate without failure for a long time. (2) The cloud platform has high real-time property, and the smart power plant cloud platform has a real-time property of millisecond level. (3) Maintenance is simple. The maintenance process of the smart power plant cloud platform is simple and easy to operate. (4) Components are reduced capacity. Each component of the smart power plant cloud platform has reduced capacity characteristics, thus simplifying the architecture of the cloud platform. (5) The smart power plant cloud platform meets the requirements of the power generation enterprises for information security. Therefore, the mainstream platform for common commercial cloud computing needs to undergo a lot of simplified packaging and transformation to meet the actual deployment needs of the power generation enterprises. The simplified cloud platform has small business concurrency, high reliability, high real-time property, flexible scalability, plug and play, and simple platform maintenance and information security.

In order to solve the above-mentioned problems, the present disclosure further provides a reduced capacity private edge cloud system for a power plant, which may avoid the problems that the architecture of the mainstream platform for common business cloud is complex and the real-time, reliability and security cannot meet the needs of smart power plants. The reduced capacity private edge cloud system for the power plant has the reduced capacity required by the smart power plants.

In order to achieve the above-mentioned purpose, the present disclosure adopts the following technical solutions.

The reduced capacity private edge cloud system for the power plant includes a cloud end and an edge end.

The cloud end is configured to perform large-scale data analysis, calculation and storage. The edge end is configured to run various intelligent control algorithms and interact with the existing DCS of the power plant. The cloud end is located in a safety area III, and the edge end is located in a safety area I. The cloud end is connected to the edge end via a reverse isolation device and a forward isolation device. The cloud end is connected to a non-production information system located in the safety area III over a power plant management network, and the edge end is connected to a plant control system over a DCS A/B network.

Furthermore, the edge end includes at least one edge node. The edge node is configured to obtain DCS real-time data of a single unit of the power plant through a DCS OPC server, and perform data interaction with the cloud end via the reverse isolation device and the forward isolation device; the edge end is further configured to send the DCS real-time data to the cloud end for analysis, calculation and storage through the forward isolation device. The cloud end is further configured to send the DCS real-time data analyzed and calculated to the edge node through the reverse isolation device. The edge node is further configured to write data into a DCS controller through the DCS OPC server to control production of the power plant.

Furthermore, the edge node includes a container operating environment, a real-time data engine, and at least one intelligent control algorithm. The container operating environment adopts a standard Docker container, and is configured to deploy the real-time data engine and the at least one intelligent control algorithm. The real-time data engine adopts an open-source real-time data engine Kafka and is deployed through the Docker container, and is configured to connect to the DCS OPC server to obtain real-time operation data of the unit and send the real-time data to the cloud end and the intelligent control algorithm. The at least one intelligent control algorithm is deployed in triple-copy containers, and configured to subscribe the real-time operation data of the unit through Kafka for inference and write a result obtained by inference to the DCS controller through the DCS OPC server to control devices.

Furthermore, in order to ensure the reliability of each edge node, in a first way, each edge node is deployed with a Master server and a Slave server that monitor a status of each other through a heartbeat mechanism. When the Master server fails, all services are migrated to the Slave server, and a system alarm mechanism is triggered. In a second way, a container for each key service is deployed with two or more backup services. When at least one of the key services fails, the backup services are enabled, and each service is upgraded in a rolling manner.

Figure 4:
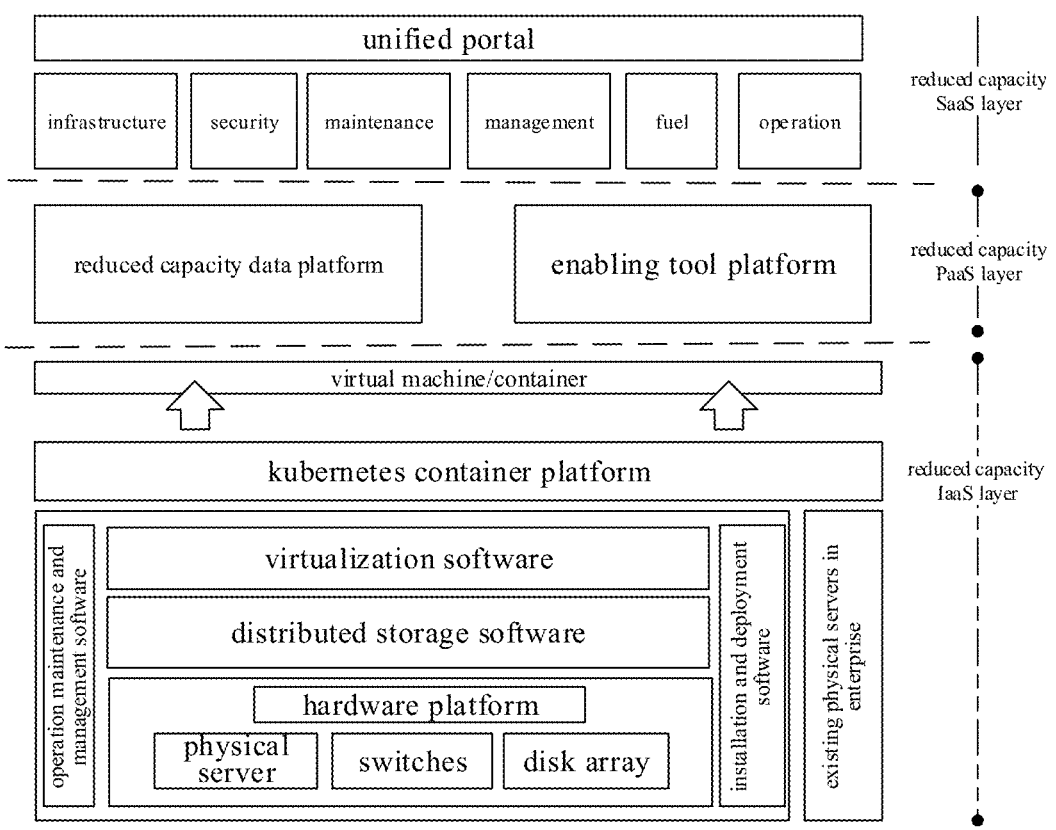
FIG. 4 is a schematic diagram showing a cloud end of a reduced capacity private edge cloud system for a power plant according to an embodiment of the present disclosure.

Furthermore, the cloud end includes a reduced capacity IaaS layer, a reduced capacity PaaS layer, and a reduced capacity SaaS layer, as shown in FIG. 4.

The reduced capacity IaaS layer includes a hardware platform, a distributed storage software, an installation and deployment software, an operation maintenance and management software, a virtualization software, and a kubernetes container platform.

The hardware platform includes 7 to 15 physical server nodes, 2 ten-gigabit switches, 1 TB-level disk array, and an optical fiber network that connects the 2 ten-gigabit switches, the physical server nodes and the disk array. The contents of the hardware platform may be flexibly expanded as required. The distributed storage software is configured to construct hard disk drive (HDD) and solid state drive (SSD) storage media of the physical server nodes and the disk array into a shared storage resource pool by using a distributed storage technology. The installation and deployment software is configured to provide onsite installation and deployment to replace virtualization software or update version onsite. The operation maintenance and management software is configured to manage virtualization resources and hardware resources of the IaaS layer to maintain and manage operations. The virtualization software is configured to virtualize the physical server nodes and the switches by using an open-source ZStack technology, provide reduced capacity network, storage and computing virtualization, and provide 100 TB to 200 TB data analysis operations and underlying virtualized resource pools for storage. The kubernetes container platform is constructed by an open-source kubernetes technology, deployed with three management nodes and four operation nodes by default, and configured to expand virtual machines or the physical servers.

The reduced capacity PaaS layer includes a reduced capacity data platform and an enabling tool platform.

The reduced capacity data platform includes a data collecting component, a data storage component, a data asset management component and a data service component. The data collecting component supports collection and import of multi-source heterogeneous data in the power plant. The data storage component is configured to store various data in the power plant through a unified data storage engine. The data asset management component supports management of all data accessed to the reduced capacity data platform, supports formation of a hierarchical tree-like data asset directory, and is configured to add, delete, modify and query data through the data asset directory. The data service component is configured to provide data to various application systems and an enabling tool platform of the reduced capacity SaaS layer, and automatically obtain necessary information of the data required.

The enabling tool platform includes a data access component, a data modeling component and a data visualization component. The data access component is configured to connect to the data service component of the reduced capacity data platform to obtain the required data. The data modeling component is configured to provide drag-and-drop modeling function, support real-time data calculation, offline data calculation and artificial intelligence modeling, and provide modeling result data to the various application systems and the data visualization component of the reduced capacity SaaS layer in the form of a standard Resetful application programming interface (API). The data visualization component provides a drag-and-drop front-end chart for displaying the modeling result data and original data on a front-end interface.

The reduced capacity SaaS layer includes an infrastructure application system, an operation application system, a maintenance application system, a security application system, a fuel application system, a management application system and a unified portal.

The six application systems are developed with a microservice architecture, and are loosely coupled to each other. Different functional modules may be provided according to the actual business needs of different power plants.

The unified portal is configured to provide a unified access portal and unified user permission management. The six application systems are connected to the unified portal by issuing the standard Resetful API, and access permission of each application system is managed by the unified portal. Permission management of internal sub-components of each application system is managed by the application system.

Furthermore, the kubernetes container platform supports at least one of a windows system and a linux system.

Furthermore, data of a terminal sensing device required by the application systems of the reduced capacity SaaS layer is configured to access the reduced capacity data platform of the reduced capacity PaaS layer for storage and management, and the reduced capacity data platform uniformly provides the data to the application systems of the reduced capacity SaaS layer.

Furthermore, models required by the application systems of the reduced capacity SaaS layer are constructed by the enabling tool platform of the reduced capacity PaaS layer, and the standard Resetful API of the enabling tool platform provides services for various application systems of the reduced capacity SaaS layer.

Furthermore, deployment resources required by the application systems of the reduced capacity SaaS layer are provided with virtual machine or container services through the reduced capacity IaaS layer.

Furthermore, the cloud end further includes a software life cycle construction release component for automatic compilation, release and testing. The software life cycle construction release module is constructed based on open source Jenkins and Gitlab, and its operation and maintenance mode is highly intelligent through AI technology. The early warning of faults may be realized through automatic monitoring means. The early warning information is classified into different types, and the early warning information of different types may be directly sent to the relevant operation and maintenance staff of the power plant. Finally, the reduced capacity private edge cloud system of the entire smart power plant adopts the visual operation and maintenance technology to provide all the early warning information that needs to be processed to the staff through a visual interface.

The present disclosure avoids the problem that the mainstream commercial cloud computing platform cannot adapt to the real-time control of the power plants. By deploying redundant edge nodes in the safety area I, the problem that the reliability, real-time and security of the mainstream commercial cloud computing platform cannot meet the control requirements of power plants was overcome. The reduced capacity private edge cloud system of the smart power plant provided by the present disclosure adopts a large number of reduced capacity components, which greatly reduces the complexity of the cloud system architecture, thus reducing the investment cost of the power generation enterprises. The reduced capacity private edge cloud system of the smart power plant provided in the present disclosure intelligentizes and visualizes the operation and maintenance process of the edge cloud system by constructing a release module for the whole life cycle of the software, which greatly reduces the professional technical requirements for the platform operation and maintenance personnel, thus reducing the human cost of the power generation enterprise, and greatly reduces the technical barriers of the cloud computing technology landing in the power generation enterprise.

Figure 3:
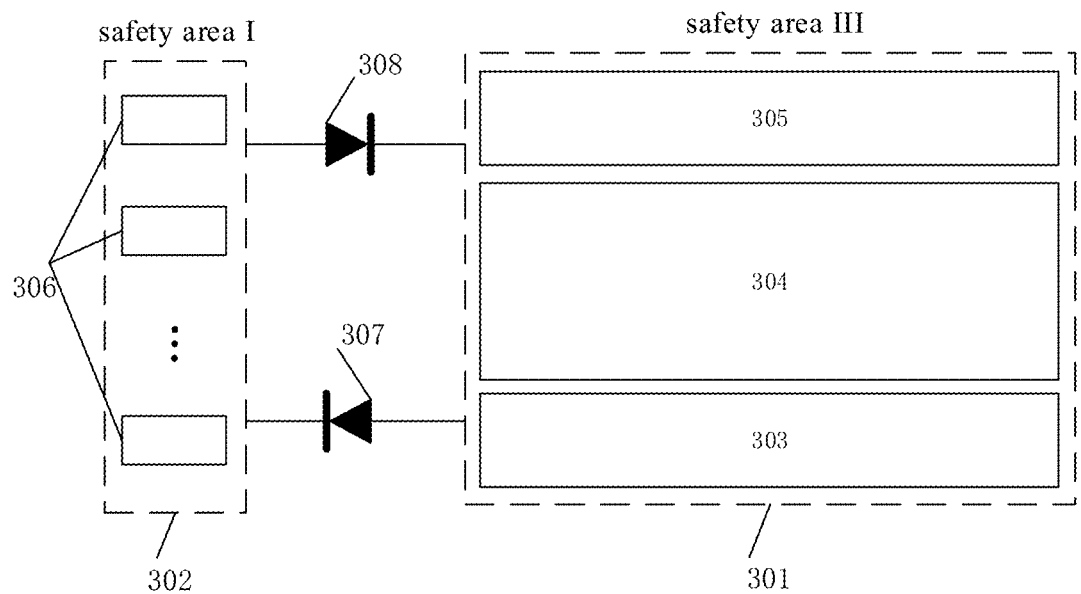
FIG. 3 is a schematic diagram showing a reduced capacity private edge cloud system for a power plant according to an embodiment of the present disclosure.

In some embodiments, as shown in FIG. 3, a thermal power plant with two 1000 MW units has constructed a reduced capacity private edge cloud system for smart power plants.

The reduced capacity private edge cloud system for the smart power plant includes a cloud end 301 and an edge end 302. The cloud end 301 is configured to perform large-scale data analysis, calculation and storage. The edge end 302 is configured to run various intelligent control algorithms and interact with the existing DCS of the power plant. The cloud end 301 is located in a safety area III, and the edge end 302 is located in a safety area I. The cloud end 301 is connected to the edge end 302 via a reverse isolation device 307 and a forward isolation device 308. The cloud end 301 is connected to a non-production information system located in the safety area III over a power plant management network, and the edge end 302 is connected to a plant control system over a DCS A/B network. The edge end 302 includes two edge nodes. The edge node is configured to obtain DCS real-time data of a single unit of the power plant through a DCS OPC server, and perform data interaction with the cloud end 301 via the reverse isolation device 307 and the forward isolation device 308. The edge end 302 sends the DCS real-time data to the cloud end 301 for analysis, calculation and storage through the forward isolation device 308. The cloud end 301 sends the DCS real-time data analyzed and calculated to the edge node through the reverse isolation device 307. The edge node writes data into a DCS controller through the DCS OPC server to control production of the power plant. The edge node includes a container operating environment, a real-time data engine, and at least one intelligent control algorithm. The container operating environment adopts a standard Docker container, and is configured to deploy the real-time data engine and the at least one intelligent control algorithm. The real-time data engine adopts an open-source real-time data engine Kafka and is deployed through the Docker container, and real-time data engine is configured to connect to the DCS OPC server to obtain real-time operation data of the unit and send the real-time data to the cloud end 301 and the intelligent control algorithm. The at least one intelligent control algorithm is deployed in triple-copy containers, and configured to subscribe the real-time operation data of the unit through Kafka for inference and write a result obtained by inference to the DCS controller through the DCS OPC server to control devices. In order to ensure the reliability of each edge node, in a first way, each edge node is deployed with a Master server and a Slave server that monitor a status of each other through a heartbeat mechanism. When the Master server fails, all services are migrated to the Slave server, and a system alarm mechanism is triggered. In a second way, a container for each key service is deployed with two or more backup services. When at least one of the key services fails, the backup services are enabled, and each service is upgraded in a rolling manner.

The cloud end 301 includes a reduced capacity IaaS layer 303, a reduced capacity PaaS layer 304, and a reduced capacity SaaS layer 305. The reduced capacity IaaS layer 303 includes a hardware platform, a distributed storage software, an installation and deployment software, an operation maintenance and management software, a virtualization software, and a kubernetes container platform. The hardware platform includes 8 physical server nodes, 2 ten-gigabit switches, 1 TB-level disk array, and an optical fiber network that connects the 2 ten-gigabit switches, the physical server nodes and the disk array. The contents of the hardware platform may be flexibly expanded as required. The distributed storage software is configured to construct hard disk drive (HDD) and solid state drive (SSD) storage media of the physical server nodes and the disk array into a shared storage resource pool by using a distributed storage technology. The installation and deployment software is configured to provide onsite installation and deployment to replace virtualization software or update version onsite. The operation maintenance and management software is configured to manage virtualization resources and hardware resources of the IaaS layer to maintain and manage operations. The virtualization software is configured to virtualize the physical server nodes and the switches by using an open-source ZStack technology, provide reduced capacity network, storage and computing virtualization, and provide 150 TB data analysis operations and underlying virtualized resource pools for storage. The kubernetes container platform is constructed by an open-source kubernetes technology, deployed with three management nodes and four operation nodes, and configured to expand virtual machines or the existing physical servers of enterprises according to actual needs. The kubernetes container platform supports a window system and a linux system.

The reduced capacity PaaS layer 304 includes a reduced capacity data platform and an enabling tool platform. The reduced capacity data platform includes a data collecting component, a data storage component, a data asset management component and a data service component. Furthermore, the data collecting component supports collection and import of multi-source heterogeneous data in the power plant, including collection and import of MySQL, Oracle, local file, HBase, Hive, influxdb, and standard Restful, and two collection and import way of timing and real-time. The data storage component is configured to store various data in the power plant through a unified data storage engine, including distributed file system HDFS, relational database MySQL and Oracle, column database HBase, unstructured database MongoDB and Redis. The data asset management component supports management of all data accessed to the reduced capacity data platform, supports formation of a hierarchical tree-like data asset directory, and is configured to add, delete, modify and query data through the data asset directory. The data service component is configured to provide data to various application systems and an enabling tool platform of the reduced capacity SaaS layer 305, and automatically obtain necessary information of the data required. The information includes a standard data interface, parameter information, a data list and a real-time value. The enabling tool platform includes a data access component, a data modeling component and a data visualization component. Furthermore, the data access component is configured to connect to the data service component of the reduced capacity data platform to obtain the required data. The data modeling component is configured to provide drag-and-drop modeling function, support real-time data calculation, offline data calculation and artificial intelligence modeling, and provide modeling result data to the various application systems and the data visualization component of the reduced capacity SaaS layer 305 in the form of a standard Restful application programming interface (API). The data visualization component provides a drag-and-drop front-end chart for displaying the modeling result data and original data on a front-end interface.

The reduced capacity SaaS layer 305 includes an infrastructure application system, an operation application system, a maintenance application system, a security application system, a fuel application system, a management application system and a unified portal. The six application systems are developed with a micro-service architecture, and are loosely coupled to each other. Different functional modules may be provided according to the actual business needs of different power plants. The unified portal is configured to provide a unified access portal and unified user permission management. The six application systems are connected to the unified portal by issuing the standard Resetful API, and access permission of each application system is managed by the unified portal. Permission management of internal sub-components of each application system is managed by the application system. Data of a terminal sensing device required by the six application systems of the reduced capacity SaaS layer 305 is configured to access the reduced capacity data platform of the reduced capacity PaaS layer 304 for storage and management, and the reduced capacity data platform uniformly provides the data to the application systems of the reduced capacity SaaS layer 305. Models required by the six application systems of the reduced capacity SaaS layer 305 are constructed by the enabling tool platform of the reduced capacity PaaS layer 304, and the standard Resetful API of the enabling tool platform provides services for various application systems of the reduced capacity SaaS layer 305. Deployment resources required by the six application systems of the reduced capacity SaaS layer 305 are provided with virtual machine or container services through the reduced capacity IaaS layer 303.

Furthermore, in the present disclosure, the smart infrastructure of the reduced capacity SaaS layer 305 includes asset management, access control management, vehicle management and project schedule management. The asset management manages inbound and outbound assets of a capital construction period. The access control management manages access of the staff for the capital construction. The vehicle management manages access of the vehicles. The project schedule management manages time nodes according to a project schedule and a on-site implementation schedule. Intelligent security includes a personnel violation identification module and a personnel safety management module. The personnel violation identification module is configured to judge whether the personnel in the work area have violations operations including smoking, not wearing a helmet, not wearing a seat belt, crossing a border, not wearing work clothes and calling during working hours. The personnel violation identification module transmits information of the personnel violations to the personnel safety management module. The personnel safety management module will punish the violators according to regulations. The intelligent operation includes an intelligent control algorithm module and an intelligent monitoring module. The intelligent control algorithm module includes at least one intelligent control algorithm, which is deployed at the corresponding edge nodes of the edge end 302. The Kafka in the edge node subscribes to the real-time data of the unit to obtain the data after the analysis and calculation of the cloud end 301 through the reverse isolation device. The control command of the intelligent control algorithm operation is written into the DCS controller through the DCS OPC server to control the production of the power plant. The intelligent monitoring module is configured to conduct threshold alarm and short-term warning for the real-time status of the unit, obtain the unit data through a reduced capacity data platform of the reduced capacity PaaS layer 304, and form the unit alarm expert knowledge base by providing an operation interface for operators to enter an alarm reason and a processing process. The smart fuel of the reduced capacity SaaS layer 305 includes fuel procurement management, fuel stacking planning, coal quality analysis and post-combustion evaluation modules. The intelligent management of the reduced capacity SaaS layer 305 may obtain all the data of the power plant through the reduced capacity data platform, and the intelligent management includes a personnel performance management module, a power plant operation cost analysis module, and an unit operation efficiency analysis module. The personnel performance management module is configured to estimate personnel performance based on the unit operation data and the workload completed by the personnel. The power plant operation cost comprehensively analyzes the fuel cost, labor cost, equipment depreciation, and maintenance cost, office procurement cost, thus realizing the analysis of the operation cost of the power plant, and the unit operation efficiency is calculated by day, month and year according to the unit operation data.

The cloud end 301 further includes a software life cycle construction release component for automatic compilation, release and testing. The software life cycle construction release module is constructed based on open source Jenkins and Gitlab, and its operation and maintenance mode is highly intelligent through AI technology. The early warning of faults may be realized through automatic monitoring means. The early warning information is classified into different types, and the early warning information of different types may be directly sent to the operation and maintenance staff related to the power plant. Finally, the reduced capacity private edge cloud system of the entire smart power plant adopts the visual operation and maintenance technology to provide all the early warning information that needs to be processed to the staff through a visual interface.

The power plant cloud edge vertical architecture system according to the present disclosure includes:

Item 1, the power plant cloud edge vertical architecture system including:
- an inter-plant cloud platform (3) provided in a power generation area or a power generation group;
- a plurality of intelligent control platforms (1); and
- a plurality of plant-side edge cloud platforms (2);
- wherein each intelligent control platform (1) corresponds to one plant-side edge cloud platform (2) and one power plant, the intelligent control platform (1) and the corresponding plant-side edge cloud platform (2) are located in the corresponding power plant;
- the intelligent control platform (1) is positively interconnected to the corresponding plant-side edge cloud platform (2) via a gigabit forward isolation device (6), and the intelligent control platform (1) is inversely interconnected to the corresponding plant-side edge cloud platform (2) via a network switching device and a hundred megabits reverse isolation device (7);
- the plant-side edge cloud platform (2) is bidirectionally interconnected to the inter-plant cloud platform (3) over a private power network (4).

Item 2, the integrated management and control system according to item 1, wherein the intelligent control platform (1) is configured to preprocess and upload data to the plant-side edge cloud platform (2) via the gigabit forward isolation device (6);
- the plant-side edge cloud platform (2) is configured to upload the data preprocessed to the inter-plant cloud platform (3) over the private power network (4); and
- the inter-plant cloud platform (3) is configured to send an intelligent control model and a common application or derived data required by the power plant to the plant-side edge cloud platform (2) over the private power network (4), and the plant-side edge cloud platform (2) is further configured to distribute the intelligent control model or derived data received to the intelligent control platform (1) via the network switching device (5) and the hundred megabits reverse isolation device (7).

Item 3, the integrated management and control system according to item 1, wherein the intelligent control platform (1) includes a high-performance server (8), a plurality of programmable logic controllers (PLCs) (9) and a plurality of communication cards (10);
- each PLC (9) corresponds to one communication card (10);
- the high-performance server (8) is connected to the PLCs (9) via a control bus, and the PLC (9) is connected to a distributed control system (DCS) via the corresponding communication card (10).

Item 4, the integrated management and control system according to item 3, wherein the high-performance server (8) is configured to perform inference operation and data calculation of the intelligent control model;
- the PLC (9) is configured to perform an intelligent control algorithm that is not compatible with an existing DCS of the power plant;
- the communication card (10) is configured to unilaterally synchronize data from the PLC (9) to the DCS;
- the high-performance server (8) is provided with an OPC client, and the data collected by the DCS is transmitted to the high-performance server (8) in a unilateral communication mode via the OPC client and an OPC server in the DCS.

Item 5, the integrated management and control system according to item 1, wherein the plant-side edge cloud platform (2) is a reduced capacity private edge cloud, and is located at a safety area III in the power plant.

Item 6, the integrated management and control system according to item 1, wherein the inter-plant cloud platform (3) adopts an industrial Internet architecture, and includes 100 to 400 server nodes.

Item 7, the integrated management and control system according to item 1, the inter-plant cloud platform (3) includes:
- a cloud resource layer constructed by an open-source OpenStack technology;
- a data resource and service layer comprising big data management tools, big data processing engine management tools, data development tools and software engineering development, testing and deployment tools; and
- a foreground application layer constructed based on a micro-service architecture.

Item 8, the integrated management and control system according to item 1, wherein the plant-side edge cloud platform (2) transmitting various intelligent control models or derived data to the intelligent control platform (1) of the power plant through the network switching device (5) and the hundred megabits reverse isolation device (7) is to:
- isolate the high-performance server (8) from the DCS;
- in response to opening of the network switching device (5), send the intelligent control model or the derived data to the intelligent control platform (1) via the hundred megabits reverse isolation device (7), so as to allow the intelligent control platform (1) to directly control production of the power plant.

Item 9, the integrated management and control system according to item 8, wherein the intelligent control platform (1) directly controls the production of the power plant by:
- sending, by the plant-side edge cloud platform (2), the intelligent control model trained to the high-performance server (8) in a form of hierarchical Docker; performing, by the high-performance server (8), real-time inference of the intelligent control model; and sending, by the high-performance server (8), a real-time inference result to the corresponding PLC (9) via a control bus to control the production of the power plant; or
- sending a real-time inference result of the intelligent control model in the high-performance server (8) to the corresponding PLC (9); and sending a control instruction from the PLC (9) to the DCS to control the production of the power plant through an original control loop of the DCS.

Item 10, the integrated management and control system according to item 8, wherein the plant-side edge cloud platform (2) is further configured to:
in response to sending the intelligent control model trained to the high-performance server (8) in the form of hierarchical Docker, distribute a complete Docker Base image for each intelligent control model to share;
in response to determining that it is required to distribute any new intelligent control model or update any intelligent control model, distribute the new intelligent control model or an updated part of the intelligent control model, and generate a new image by extending the Docker Base image.

The reduced capacity private edge cloud system for the power plant in the present disclosure includes:

Item 11, the integrated management and control system including:
a cloud end located in a safety area III and configured to perform large-scale data analysis, calculation and storage; and
an edge end located in a safety area I and configured to run various intelligent control algorithms and interact with the existing DCS of the power plant;
wherein the cloud end is connected to the edge end via a reverse isolation device and a forward isolation device, the cloud end is connected to a non-production information system located in the safety area III over a power plant management network, and the edge end is connected to the intelligent control system for power plant over a DCS A/B network.

Item 12, the integrated management and control system according to item 11, wherein the edge end comprises at least one edge node;
the edge node is configured to obtain DCS real-time data of a single unit of the power plant through a DCS OPC server, and perform data interaction with the cloud end via the reverse isolation device and the forward isolation device;
the edge end is further configured to send the DCS real-time data to the cloud end for analysis, calculation and storage through the forward isolation device;
the cloud end is further configured to send the DCS real-time data analyzed and calculated to the edge node through the reverse isolation device;
the edge node is further configured to write data into a DCS controller through the DCS OPC server to control production of the power plant.

Item 13, the integrated management and control system according to item 12, wherein the edge node comprises a container operating environment, a real-time data engine, and at least one intelligent control algorithm;
the container operating environment adopts a standard Docker container, and is configured to deploy the real-time data engine and the at least one intelligent control algorithm;
the real-time data engine adopts an open-source real-time data engine Kafka and is deployed through the Docker container, and is configured to connect to the DCS OPC server to obtain real-time operation data of the unit and send the real-time data to the cloud end and the intelligent control algorithm;
the at least one intelligent control algorithm is deployed in triple-copy containers, and configured to subscribe the real-time operation data of the unit through Kafka for inference and write a result obtained by inference to the DCS controller through the DCS OPC server to control devices.

Item 14, the integrated management and control system according to item 12, wherein each edge node is deployed with a Master server and a Slave server that monitor a status of each other through a heartbeat mechanism;
in case that the Master server fails, all services are migrated to the Slave server, and a system alarm mechanism is triggered;
a container for each key service is deployed with two or more backup services, and in case that at least one of the key services fails, the backup services are enabled, and each service is upgraded in a rolling manner.

Item 15, the integrated management and control system according to item 11, wherein the cloud end comprises a reduced capacity IaaS layer, a reduced capacity PaaS layer, and a reduced capacity SaaS layer;
the reduced capacity IaaS layer comprises:
a hardware platform comprising 7 to 15 physical server nodes, 2 ten-gigabit switches, 1 TB-level disk array, and an optical fiber network that connects the 2 ten-gigabit switches, the physical server nodes and the disk array;
a distributed storage software configured to construct hard disk drive (HDD) and solid state drive (SSD) storage media of the physical server nodes and the disk array into a shared storage resource pool by using a distributed storage technology;
an installation and deployment software configured to provide onsite installation and deployment to replace virtualization software or update version onsite;
an operation maintenance and management software configured to manage virtualization resources and hardware resources of the IaaS layer to maintain and manage operations;
a virtualization software configured to virtualize the physical server nodes and the switches by using an open-source ZStack technology, provide reduced capacity network, storage and computing virtualization, and provide 100 TB to 200 TB data analysis operations and underlying virtualized resource pools for storage; and
a kubernetes container platform constructed by an open-source kubernetes technology, deployed with three management nodes and four operation nodes by default, and configured to expand virtual machines or the physical servers;
the reduced capacity PaaS layer comprises:
a reduced capacity data platform comprising a data collecting component, a data storage component, a data asset management component and a data service component; wherein the data collecting component supports collection and import of multi-source heterogeneous data in the power plant; the data storage component is configured to store various data in the power plant through a unified data storage engine; the data asset management component supports management of all data accessed to the reduced capacity data platform, supports formation of a hierarchical tree-like data asset directory, and is configured to add, delete, modify and query data through the data asset directory; the data service component is configured to provide data to various application systems and an enabling tool platform of the reduced capacity SaaS layer, and automatically obtain necessary information of the data required; and the enabling tool platform comprising a data access component, a data modeling component and a data visualization component; wherein the data access component is configured to connect to the data service component of the reduced capacity data platform to obtain the required data; the data modeling component is configured to provide drag-and-drop modeling function, support real-time data calculation, offline data calculation and artificial intelligence modeling, and provide modeling result data to the various application systems and the data visualization component of the reduced capacity SaaS layer in the form of a standard Resetful application programming interface (API); the data visualization component provides a drag-and-drop front-end chart for displaying the modeling result data and original data on a front-end interface;

the reduced capacity SaaS layer comprises an infrastructure application system, an operation application system, a maintenance application system, a security application system, a fuel application system, a management application system and an unified portal; wherein the application systems are developed with a micro-service architecture, and are loosely coupled to each other; the unified portal is configured to provide a unified access portal and unified user permission management; the application systems are connected to the unified portal by issuing the standard Resetful API, and access permission of each application system is managed by the unified portal; permission management of internal sub-components of each application system is managed by the application system.

Item 16, the integrated management and control system according to item 15, wherein the kubernetes container platform supports at least one of a windows system and a linux system.

Item 17, the integrated management and control system according to item 15, wherein data of a terminal sensing device required by the application systems of the reduced capacity SaaS layer is configured to access the reduced capacity data platform of the reduced capacity PaaS layer for storage and management, and the reduced capacity data platform uniformly provides the data to the application systems of the reduced capacity SaaS layer.

Item 18, The integrated management and control system according to item 15, wherein models required by the application systems of the reduced capacity SaaS layer are constructed by the enabling tool platform of the reduced capacity PaaS layer, and the standard Resetful API of the enabling tool platform provides services for various application systems of the reduced capacity SaaS layer.

Item 19, The integrated management and control system according to item 15, wherein deployment resources required by the application systems of the reduced capacity SaaS layer are provided with virtual machine or container services through the reduced capacity IaaS layer.

Item 20, the integrated management and control system according to item 15, wherein the cloud end further includes a software life cycle construction release component for automatic compilation, release and testing; the software life cycle construction release component is constructed based on open source Jenkins and Gitlab, and has highly intelligent operation and maintenance mode through AI technology;

early warning of faults is realized through automatic monitoring means; the early warning information is classified into different types, and information of the early warning of different types is sent to the relevant operation and maintenance staff of the power plant; the reduced capacity private edge cloud system of the entire smart power plant adopts a visual operation and maintenance technology to provide the early warning information that needs to be processed to the staff through a visual interface.

Although the present disclosure has been described in detail with general description and specific implementation scheme, it is obvious to those skilled in the art that some modifications or improvements may be made on the basis of the present disclosure. Therefore, these modifications or improvements made on the basis of not deviating from the spirit of the present disclosure are within the scope of protection required by the present disclosure.

What is claimed is:

1. An integrated management and control system for a power plant, comprising:
   a power plant cloud edge vertical architecture system comprising:
      an inter-plant cloud platform provided in a power generation area or a power generation group;
      a plurality of intelligent control platforms; and
      a plurality of plant-side edge cloud platforms;
   wherein each intelligent control platform corresponds to one plant-side edge cloud platform and one power plant, the intelligent control platform and the corresponding plant-side edge cloud platform are located in the corresponding power plant;
   the intelligent control platform is positively interconnected to the corresponding plant-side edge cloud platform via a forward isolation device, and the intelligent control platform is inversely interconnected to the corresponding plant-side edge cloud platform via a network switching device and a reverse isolation device; and
   the plant-side edge cloud platform is bidirectionally interconnected to the inter-plant cloud platform over a private power network.

2. The integrated management and control system according to claim 1, wherein the intelligent control platform is configured to preprocess and upload data to the plant-side edge cloud platform via the forward isolation device;
   the plant-side edge cloud platform is configured to upload the data preprocessed to the inter-plant cloud platform over the private power network; and
   the inter-plant cloud platform is configured to send an intelligent control model and a common application or derived data required by the power plant to the plant-side edge cloud platform over the private power network, and the plant-side edge cloud platform is further configured to distribute the intelligent control model or derived data received to the intelligent control platform via the network switching device and the reverse isolation device.

3. The integrated management and control system according to claim 1, wherein the intelligent control platform comprises a server, a plurality of programmable logic controllers (PLCs) and a plurality of communication cards;
   each PLC corresponds to one communication card; and
   the server is connected to the PLCs via a control bus, and the PLC is connected to a distributed control system (DCS) via the corresponding communication card.

4. The integrated management and control system according to claim 3, wherein the server is configured to perform inference operation and data calculation of an intelligent control model;
   the PLC is configured to perform an intelligent control algorithm that is not compatible with an existing DCS of the power plant;
   the communication card is configured to unilaterally synchronize data from the PLC to the DCS; and
   the server is provided with an OPC client, and the data collected by the DCS is transmitted to the server in a unilateral communication mode via the OPC client and an OPC server in the DCS.

5. The integrated management and control system according to claim 1, wherein the plant-side edge cloud platform is a reduced capacity private edge cloud, and is located at a safety area III in the power plant.

6. The integrated management and control system according to claim 1, wherein the inter-plant cloud platform adopts an industrial Internet architecture, and comprises 100 to 400 server nodes.

7. The integrated management and control system according to claim 1, the inter-plant cloud platform comprises:
   a cloud resource layer constructed by an open-source OpenStack technology;
   a data resource and service layer comprising big data management tools, big data processing engine management tools, data development tools and software engineering development, testing and deployment tools; and
   a foreground application layer constructed based on a micro-service architecture.

8. The integrated management and control system according to claim 2, wherein the intelligent control platform is further configured to:
   isolate the server from the DCS; and
   in response to opening of the network switching device, send the intelligent control model or the derived data to the intelligent control platform via the reverse isolation device, so as to allow the intelligent control platform to directly control production of the power plant.

9. The integrated management and control system according to claim 8, wherein the intelligent control platform directly controls the production of the power plant by:
   sending, by the plant-side edge cloud platform, the intelligent control model trained to the server in a form of hierarchical Docker; performing, by the server, real-time inference of the intelligent control model; and sending, by the server, a real-time inference result to the corresponding PLC via a control bus to control the production of the power plant; or
   sending a real-time inference result of the intelligent control model in the server to the corresponding PLC; and sending a control instruction from the PLC to the DCS to control the production of the power plant through an original control loop of the DCS.

10. The integrated management and control system according to claim 9, wherein the plant-side edge cloud platform is further configured to:
   in response to sending the intelligent control model trained to the server in the form of hierarchical Docker, distribute a complete Docker Base image for each intelligent control model to share; and
   in response to determining that it is required to distribute any new intelligent control model or update any intelligent control model, distribute the new intelligent control model or an updated part of the intelligent control model, and generate a new image by extending the Docker Base image.

11. The integrated management and control system according to claim 1, wherein the plant-side edge cloud platform is a reduced capacity private edge cloud system for a power plant comprising:
   a cloud end located in a safety area III and configured to perform large-scale data analysis, calculation and storage; and
   an edge end located in a safety area I and configured to run various intelligent control algorithms and interact with the existing DCS of the power plant;
   wherein the cloud end is connected to the edge end via a reverse isolation device and a forward isolation device, the cloud end is connected to a non-production information system located in the safety area III over a power plant management network, and the edge end is connected to the DCS over a DCS A/B network.

12. The integrated management and control system according to claim 11, wherein the edge end comprises at least one edge node;
   the edge node is configured to obtain DCS real-time data of a single unit of the power plant through a DCS OPC server, and perform data interaction with the cloud end via the reverse isolation device and the forward isolation device;
   the edge end is further configured to send the DCS real-time data to the cloud end for analysis, calculation and storage through the forward isolation device;
   the cloud end is further configured to send the DCS real-time data analyzed and calculated to the edge node through the reverse isolation device; and
   the edge node is further configured to write data into a DCS controller through the DCS OPC server to control production of the power plant.

13. The integrated management and control system according to claim 12, wherein the edge node comprises a container operating environment, a real-time data engine, and at least one intelligent control algorithm;
   the container operating environment adopts a standard Docker container, and is configured to deploy the real-time data engine and the at least one intelligent control algorithm;
   the real-time data engine adopts an open-source real-time data engine Kafka and is deployed through the Docker container, and is configured to connect to the DCS OPC server to obtain real-time operation data of the unit and send the real-time data to the cloud end and the intelligent control algorithm; and
   the at least one intelligent control algorithm is deployed in triple-copy containers, and configured to subscribe the real-time operation data of the unit through Kafka for inference and write a result obtained by inference to the DCS controller through the DCS OPC server to control devices.

14. The integrated management and control system according to claim 12, wherein each edge node is deployed with a Master server and a Slave server that monitor a status of each other through a heartbeat mechanism;

in case that the Master server fails, all services are migrated to the Slave server, and a system alarm mechanism is triggered; and a container for each key service is deployed with two or more backup services, and in case that at least one of the key services fails, the backup services are enabled, and each service is upgraded in a rolling manner.

15. The integrated management and control system according to claim 11, wherein the cloud end comprises a reduced capacity IaaS layer, a reduced capacity PaaS layer, and a reduced capacity SaaS layer;

the reduced capacity IaaS layer comprises:
a hardware platform comprising 7 to 15 physical server nodes, 2 ten-gigabit switches, 1 TB-level disk array, and an optical fiber network that connects the 2 ten-gigabit switches, the physical server nodes and the disk array;

a distributed storage software configured to construct hard disk drive (HDD) and solid state drive (SSD) storage media of the physical server nodes and the disk array into a shared storage resource pool by using a distributed storage technology;

an installation and deployment software configured to provide onsite installation and deployment to replace virtualization software or update version onsite;

an operation maintenance and management software configured to manage virtualization resources and hardware resources of the IaaS layer to maintain and manage operations;

a virtualization software configured to virtualize the physical server nodes and the switches by using an open-source ZStack technology, provide reduced capacity network, storage and computing virtualization, and provide 100 TB to 200 TB data analysis operations and underlying virtualized resource pools for storage; and a kubernetes container platform constructed by an open-source kubernetes technology, deployed with three management nodes and four operation nodes by default, and configured to expand virtual machines or the physical servers;

the reduced capacity PaaS layer comprises:
a reduced capacity data platform comprising a data collecting component, a data storage component, a data asset management component and a data service component; wherein the data collecting component supports collection and import of multi-source heterogeneous data in the power plant; the data storage component is configured to store various data in the power plant through a unified data storage engine; the data asset management component supports management of all data accessed to the reduced capacity data platform, supports formation of a hierarchical tree-like data asset directory, and is configured to add, delete, modify and query data through the data asset directory; the data service component is configured to provide data to various application systems and an enabling tool platform of the reduced capacity SaaS layer, and automatically obtain necessary information of the data required; and the enabling tool platform comprising a data access component, a data modeling component and a data visualization component; wherein the data access component is configured to connect to the data service component of the reduced capacity data platform to obtain the required data; the data modeling component is configured to provide drag-and-drop modeling function, support real-time data calculation, offline data calculation and artificial intelligence modeling, and provide modeling result data to the various application systems and the data visualization component of the reduced capacity SaaS layer in the form of a standard Resetful application programming interface (API); the data visualization component provides a drag-and-drop front-end chart for displaying the modeling result data and original data on a front-end interface; and the reduced capacity SaaS layer comprises an infrastructure application system, an operation application system, a maintenance application system, a security application system, a fuel application system, a management application system and an unified portal; wherein the application systems are developed with a micro-service architecture, and are loosely coupled to each other; the unified portal is configured to provide a unified access portal and unified user permission management; the application systems are connected to the unified portal by issuing the standard Resetful API, and access permission of each application system is managed by the unified portal; permission management of internal sub-components of each application system is managed by the application system.

16. The integrated management and control system according to claim 15, wherein the kubernetes container platform supports at least one of a windows system and a linux system.

17. The integrated management and control system according to claim 15, wherein data of a terminal sensing device required by the application systems of the reduced capacity SaaS layer is configured to access the reduced capacity data platform of the reduced capacity PaaS layer for storage and management, and the reduced capacity data platform uniformly provides the data to the application systems of the reduced capacity SaaS layer.

18. The integrated management and control system according to claim 15, wherein models required by the application systems of the reduced capacity SaaS layer are constructed by the enabling tool platform of the reduced capacity PaaS layer, and the standard Resetful API of the enabling tool platform provides services for various application systems of the reduced capacity SaaS layer.

19. The integrated management and control system according to claim 15, wherein deployment resources required by the application systems of the reduced capacity SaaS layer are provided with virtual machine or container services through the reduced capacity IaaS layer.

20. The integrated management and control system according to claim 15, wherein the cloud end further comprises a software life cycle construction release component for automatic compilation, release and testing;

the software life cycle construction release component is configured to manage a whole process of application development, testing, online publishing, operation and maintenance of the reduced capacity SaaS layer.

* * * * *